US008471761B1

(12) United States Patent  (10) Patent No.: US 8,471,761 B1
Hogg  (45) Date of Patent: Jun. 25, 2013

(54) WIDEBAND RADAR NULLING SYSTEM

(75) Inventor: Robert Douglas Hogg, Santa Barbara, CA (US)

(73) Assignee: Akela, Inc., Santa Barbara, CA (US)

( * ) Notice: Subject to any disclaimer, the term of this patent is extended or adjusted under 35 U.S.C. 154(b) by 242 days.

(21) Appl. No.: 13/033,515

(22) Filed: Feb. 23, 2011

Related U.S. Application Data

(60) Provisional application No. 61/327,561, filed on Apr. 23, 2010.

(51) Int. Cl.
*G01S 13/50* (2006.01)
(52) U.S. Cl.
USPC .............. 342/159; 342/28; 342/114; 342/194
(58) Field of Classification Search
USPC .................... 342/159–162, 28, 114
See application file for complete search history.

(56) References Cited

U.S. PATENT DOCUMENTS

| | | | |
|---|---|---|---|
| 3,021,521 A | 2/1962 | Hutchins | |
| 4,318,099 A * | 3/1982 | Hsiao | 342/160 |
| 4,496,949 A * | 1/1985 | Bettini et al. | 342/160 |
| 4,688,044 A * | 8/1987 | O'Brien | 342/160 |
| 4,809,002 A * | 2/1989 | Togashi et al. | 342/160 |
| 4,968,967 A | 11/1990 | Stove | |
| 5,294,933 A * | 3/1994 | Lee et al. | 342/159 |
| 5,446,461 A | 8/1995 | Frazier | |
| 5,861,837 A | 1/1999 | Richardson et al. | |
| 6,664,920 B1 | 12/2003 | Mott et al. | |
| 6,704,349 B1 | 3/2004 | Masenten | |
| 6,801,153 B2 | 10/2004 | Rauch et al. | |
| 7,061,998 B1 | 6/2006 | Rodgers et al. | |
| 7,202,812 B2 | 4/2007 | Krikorian et al. | |
| 7,474,258 B1 * | 1/2009 | Arikan et al. | 342/159 |
| 8,344,944 B2 * | 1/2013 | Goodman | 342/159 |
| 2007/0247353 A1 * | 10/2007 | Budic | 342/159 |
| 2013/0016002 A1 * | 1/2013 | Edwards | 342/159 |

OTHER PUBLICATIONS

Techau, P.M.;, "Effects of receiver filtering on hot clutter mitigation," Radar Conference, 1999. The Record of the 1999 IEEE, vol., no., pp. 84-89, 1999.*
Dawood, N.; Narayanan, R.M.; , "Multipath and ground clutter analysis for a UWB noise radar," Aerospace and Electronic Systems, IEEE Transactions on , vol. 38, No. 3, pp. 838-853, Jul. 2002.*
Greene, " An Optimum Filter for Direct A/D Conversion 1991" IEEE Transactions on Aerospace and Electronic Systems , vol. 27, No. 6 Nov. 1991.

(Continued)

*Primary Examiner* — John B Sotomayor
(74) *Attorney, Agent, or Firm* — Knobbe Martens Olson & Bear LLP

(57) ABSTRACT

This disclosure describes a radar system that in certain embodiments can, among other features, take into account the phase noise and/or drift of a transmit signal when generating a nulling signal. A receiver of the radar system can produce an IF signal by mixing a received signal with a local oscillator. The receiver can also mix the local oscillator with a transmit signal provided directly by the transmitter to the receiver to produce a control signal. Using the control signal to generate a nulling signal, the receiver can maintain or substantially maintain phase coherence between the nulling signal and the transmit signal. As a result, in certain embodiments, more precise nulling can occur, resulting in greater receiver sensitivity. Improved receiver sensitivity can provide a greater maximum detectable range and/or improved target detection.

23 Claims, 10 Drawing Sheets

OTHER PUBLICATIONS

Parguian, "Building a Stable DAC External Reference Circuit", Texas Instruments. Application Report SLAA172—Mar. 2003.

ARRL, "The ARRL Handbook" for Radio Communications. pp. 15.22 through 15.25 (2009).

Skolnik, " Introduction to Radar Systems" pp. 612-613 (2001) Chapter 9, The Radar Antenna.

Barton, "Digital beam forming for radar" IEEE Proc, vol. 127, pt F, No. 4, Aug. 1980.

* cited by examiner

US 8,471,761 B1

WIDEBAND RADAR NULLING SYSTEM

STATEMENT REGARDING FEDERALLY SPONSORED R&D

The inventions disclosed herein were made with government support under contract numbers W909MY-04-C-0008 and W909MY-05-C-0003 awarded by the United States Army. The government has certain rights in the inventions.

BACKGROUND

Continuous wave (CW) radar systems offer certain advantages over pulse radar systems. Even so, CW radar systems suffer from a disadvantage of a strong direct path signal being coupled between the transmit and receive antennas. The direct path signal can result from imperfect isolation between the transmit and receive antennas as well as from scattering from nearby objects. The direct path signal can be several orders of magnitude larger than the received signal of interest and therefore tends to hide the received signal. As a result, the direct path signal can reduce the sensitivity of the receiver. With reduced sensitivity, the maximum range of the radar is reduced.

One solution for reducing the direct path signal has been to separate the receive antenna from the transmit antenna. This provides better isolation between the transmit and receive paths. However, even relatively small side lobes in the transmit and receive antennas will result in coupling that allows leakage signals to occur. In addition, scattering from nearby objects can still result in a significant direct path signal received at the receiver.

SUMMARY

In certain embodiments, a system for reducing noise in a radar is provided. The system can include a radar transmitter that can transmit a transmit wideband signal and a radar receiver that can receive a receive wideband signal that includes a portion of the transmit wideband signal. In certain embodiments, the receiver includes an intermediate frequency stage that can down-convert the receive wideband signal into an intermediate frequency signal, a mixer that can generate a control signal at least partially from the transmit wideband signal and from an oscillator of the intermediate frequency stage, and a nulling circuit in communication with the intermediate frequency stage. The nulling circuit can generate a nulling signal based at least in part on the control signal. The control signal can cause the nulling signal to be substantially in phase with the intermediate frequency signal.

Further, in some embodiments, a method of reducing noise in a radar can include: receiving a transmitted signal with a radar receiver, mixing the transmit signal at the receiver with an oscillator of the receiver to produce a first clock signal, generating an intermediate frequency signal from the received signal with the oscillator of the receiver, and sampling the intermediate frequency signal at a rate that depends at least in part on the first clock signal, such that phase noise in the intermediate frequency signal is reduced.

Certain aspects, advantages and novel features of the inventions are described herein. It is to be understood that not necessarily all such advantages may be achieved in accordance with any particular embodiment of the inventions disclosed herein. Thus, the inventions disclosed herein may be embodied or carried out in a manner that achieves or selects one advantage or group of advantages as taught herein without necessarily achieving other advantages as may be taught or suggested herein.

BRIEF DESCRIPTION OF THE DRAWINGS

Throughout the drawings, reference numbers can be reused to indicate correspondence between referenced elements. The drawings are provided to illustrate embodiments of the inventions described herein and not to limit the scope thereof.

DETAILED DESCRIPTION

Introduction

Figure 1:
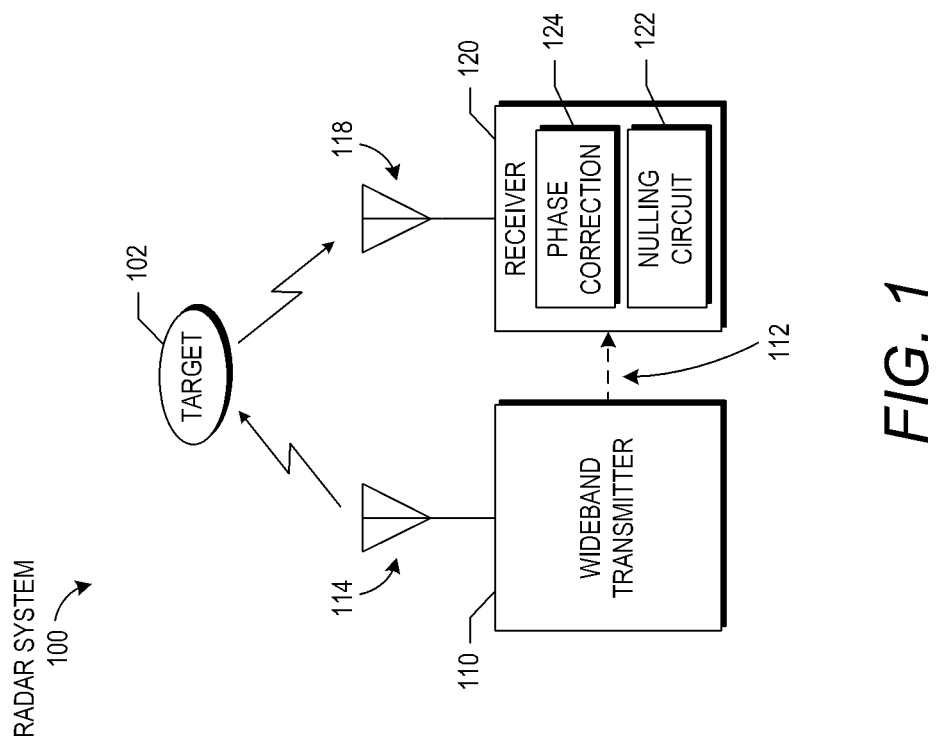
FIG. 1 illustrates an embodiment of a wideband radar system with direct path correction features.

One technique that can be used to mitigate the direct path signal in a CW radar is to sample the transmitted radio frequency (RF) output, change its phase by 180°, and then combine the phase-adjusted signal with the received RF signal. This technique can work well for radar that operates over a narrow bandwidth. However, this same technique is extremely difficult to implement with analog RF circuits in a wideband radar. An analog broadband attenuator and phase shifter, for example, can be very difficult to implement because a phase shifter tends to shift phase over only a narrow frequency band. Cascading multiple phase shifters to overcome this problem can then make proper attenuation difficult. Moreover, analog RF components are subject to temperature variation and stability issues, limiting the potential sensitivity of the receiver.

One potential solution to mitigate these problems is to provide a nulling signal generator that generates a nulling signal from a fixed oscillator. The nulling signal can be combined with an intermediate frequency (IF) signal to null the direct path signal at IF instead of RF. A feedback loop can be established from the output of the summed signal to the input of the signal generator. Nulling at the relatively narrowband IF instead of the wideband RF can allow phase shifts to be performed over the entire IF bandwidth. In addition, the feedback loop can reduce the effects of analog temperature variation and stability issues.

However, there are two issues that limit the usefulness of this technique. First, because the nulling signal is generated with a fixed oscillator, phase noise and drift in the frequency of the transmit signal and local oscillator can disrupt the phase relationship useful for nulling, thus reducing the effectiveness of the nulling. In addition, feedback loops generally have filters, and the effect of these filters is to make the nulling a dynamic process. That is, in such systems, only the changes in the returns are present. For detecting fixed targets in such nulling systems, there is a minimum speed that may be necessary for the radar motion to facilitate detection. For a fixed radar using these nulling systems, there may be a minimum speed that is necessary for the targets to facilitate detection.

This disclosure describes a radar system that can, in certain embodiments, take into account the phase noise and/or frequency drift of a transmit signal when generating a nulling signal. A receiver of the radar system can produce an IF signal by mixing a received signal with a local oscillator. The receiver can also mix the local oscillator with a transmit signal to produce a control signal. Using the control signal to generate a nulling signal, the receiver can maintain or substantially maintain phase coherence between the nulling signal and the transmit signal. In certain embodiments, more precise nulling can occur, thereby resulting in greater receiver sensitivity. Improved receiver sensitivity can provide a greater maximum detectable range and/or improved target detection.

As used herein, the term "wideband" and "broadband," in addition to having their ordinary meaning, can include either baseband bandwidth or wide fractional bandwidth. For example, the baseband bandwidth of a radar operating from 34 GHz to 36 GHz can be the same as that of a radar operating from 1 GHz to 3 Ghz, namely 2 GHz. However, the fractional bandwidth from 34 GHz to 36 GHz is 4/35, or 10%, whereas the fractional bandwidth from 1 GHz to 3 Ghz is 2/2, or 100%. Thus, while their baseband bandwidths are the same, the 1-3 GHz radar has a much wider fractional bandwidth. In addition, as used herein, the term "null" and its derivatives, in addition to having their ordinary meaning, can mean attenuating a a signal or canceling a signal.

System Overview

Referring to the Figures, FIG. 1 illustrates a simplified embodiment of a wideband radar system 100 with direct path correction features. The wideband radar system 100 includes a wideband transmitter 110 that emits electromagnetic signals via one or more antennas 114 at a target 102. The signals emitted by the transmitter 110 can be continuous wave signals or pulse signals. In one embodiment, the continuous wave signals emitted by the transmitter 110 are on continuously. In another embodiment, the waves are pulse signals with a high duty cycle (e.g., close to 100%). Thus, in addition to having its ordinary meaning, "continuous wave" can include waves that are pulsed at a relatively higher duty cycle than usual pulse radar waves. Said another way, the transmitter can be transmitting most or all of the time.

The transmitter 110 can transmit signals over a wide or broad spectrum. For instance, the transmitter 110 can use frequency stepping techniques to transmit over a variety of frequencies. In one embodiment, the transmitter 110 employs spread-spectrum transmission, such as by frequency hopping. In one embodiment, the transmitter 110 performs a linear frequency sweep using discrete frequencies to cover a wide spectrum. Many other wideband techniques can also be used. In some embodiments, the transmissions made by the transmitter 110 can be referred to as ultra-wideband transmissions. However, in at least some embodiments, the transmitter 110 transmits over a narrow spectrum.

The wideband radar system 100 has many practical benefits over narrowband radar systems. Wideband transmissions can be used, for instance, to detect targets 102 through obstacles, such as walls, because some frequencies pass through different walls more effectively than others. Using a narrow frequency radar runs the risk of selecting a frequency that will not adequately penetrate some or all walls. Other applications for the wideband radar system 100 can include concealed weapons detection, improvised explosive device (IED) detection, mine detection, and the like.

A portion of the signals transmitted by the transmitter 110 reflect off of the target 102 and are received by a receiver 120 via one or more antennas 118. In one embodiment, the receiver 120 is a superheterodyne receiver. As such, the receiver 120 can receive RF signals and down-convert the RF signals to IF signals. The receiver can then down-convert the IF signals to baseband signals. In other embodiments, however, the receiver 120 can be a homodyne, converting from an RF carrier directly to baseband.

A direct path signal scattered from nearby objects and/or directly from side lobe coupling with the transmit antenna(s) 114 is received by the receiver 120 in addition to the target signal. In some embodiments, the direct path signal can be significantly stronger than the relatively weaker signals received from the target 102. The sensitivity of the receiver 120 can be limited by the strength of the direct path signal. In certain embodiments, the receiver 120 therefore includes a nulling circuit 122 that can attenuate the direct path signal. The nulling circuit 122 can be implemented in hardware, software, firmware, or a combination of the same.

Advantageously, in certain embodiments, the nulling circuit 122 operates digitally at least in part to avoid the variability and instability of analog components. For example, a processor can control the nulling circuit 122. Using digital control can also provide greater control over the frequencies nulled, among other benefits. The nulling circuit 122 can generate a nulling signal and combine the nulling signal with the IF signal. The nulling circuit 122 can therefore attenuate the direct path signal contained in the IF signal.

Advantageously, in certain embodiments, the nulling circuit 122 generates the nulling signal in phase or substantially in phase with a phase of the transmitted signal. This phase coherence can be provided by a phase correction circuitry 124. Like the nulling circuit 122, the phase coherence circuitry 124 can be implemented in hardware, software, firmware, or a combination of the same. In certain embodiments, the phase correction circuitry 124 can use a portion of the transmitted signal 112 received directly from the transmitter 110 to generate the nulling signal. In addition, the phase correction circuitry 124 can reduce phase noise when sampling the IF signal. Moreover, the phase correction circuitry 124 can be used to facilitate digital down-conversion of the IF signal. These and other features of embodiments of the radar system 100 will be described in greater detail below.

Transmitter

Figure 2:
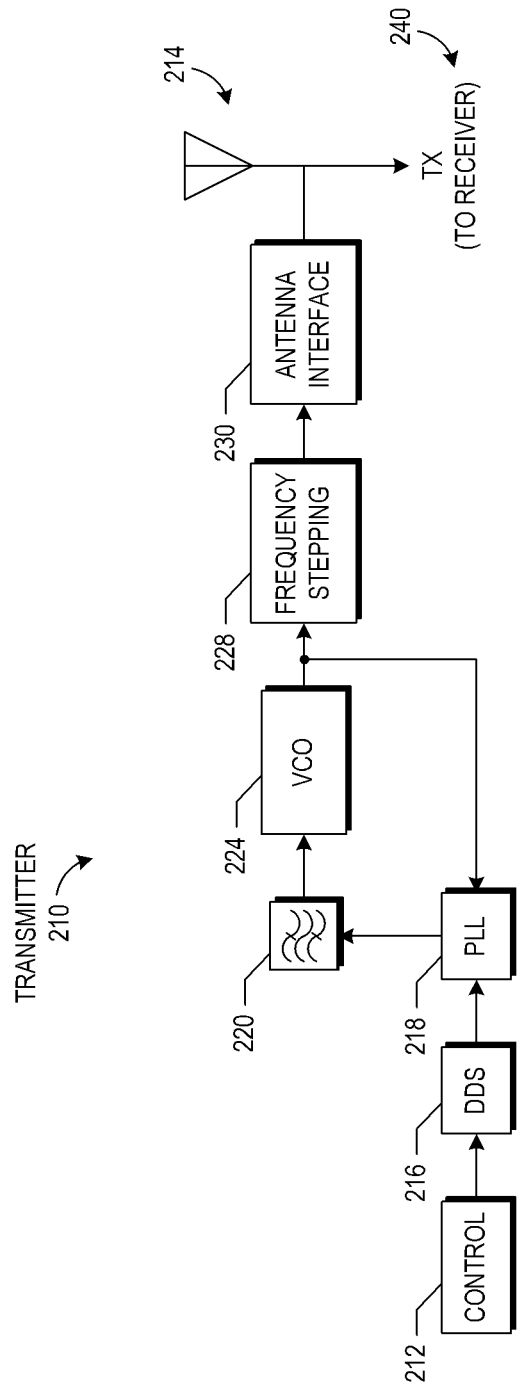
FIG. 2 illustrates an embodiment of a transmitter of the radar system of FIG. 1.

FIG. 2 illustrates an embodiment of a radar transmitter 210 that can be implemented as an embodiment of the transmitter 110 described above. As such, the transmitter 210 can include all the features of the transmitter 110. The features of the transmitter 210 can be implemented in hardware, software, firmware, or a combination of the same. Advantageously, in certain embodiments, the transmitter provides a transmit signal to a receiver (see FIGS. 4A and 4B) to allow the receiver to track the phase of the transmit signal when nulling or for other purposes.

In the depicted embodiment, the transmitter 210 is a stepped-frequency transmitter 210. As such, the transmitter 210 can step linearly or randomly through a plurality of frequency bands. A control module 212 can automatically select frequency bands and provide the frequency selections to a direct digital synthesizer (DDS) 216. The control module 212 can be a processor or the like. The DDS 216 can generate reference frequency waveforms for a voltage controlled oscillator (VCO) 224. The VCO 224 can be tunable to a variety of frequencies. For example, in one implementation, the VCO 224 is tunable over the range of about 1-2 GHz, about 0.5-3 GHz, about 0.25 to 4 GHz, or some other suitable range. However, although the features of this specification are described in the context of wideband radar, some or all of the features can be applied to narrowband radar. For example, any radar transmitting on one of these or other frequency bands can use at least some of the features described herein.

A phase-locked loop (PLL) 218 and filter 220 regulate the phase of the frequency waveforms output by the VCO 224. The frequency waveform output by the VCO 224 can be a sinusoidal wave or any other suitable waveform, such as a square wave, sawtooth, wave, combinations of the same, or the like. The VCO 224 provides frequency waveforms to a frequency stepping module 228. The frequency stepping module 228 can divide the frequency output by the VCO 224 into sub-bands. For instance, if the VCO 224 outputs frequencies in the range of 1-2 GHz, the frequency stepping module 228 can divide this frequency band into a 0.25-0.5 GHz band, a 0.5-1 GHz band, a 1-1.5 GHz band, and a 1.5-2 GHz band. These ranges are merely examples and can be varied in many implementations.

Figure 3:
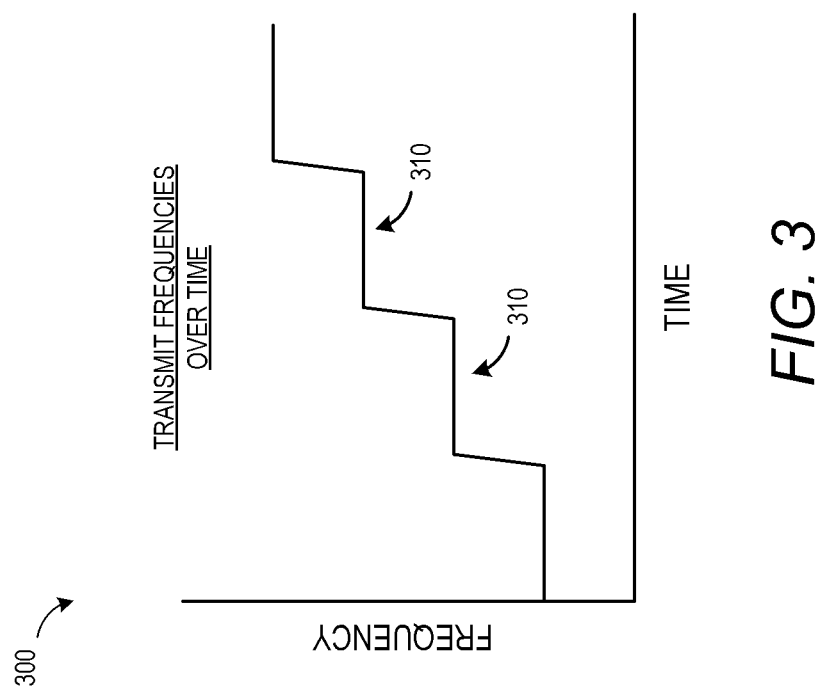
FIG. 3 illustrates an embodiment of frequency stepping that can be performed by the transmitter of FIG. 2.

The frequency stepping module 228 can select between the divided frequency bands for transmission. For example, with reference to FIG. 3, an example graph 300 is shown representing example frequency steps 310 that can be selected by the frequency stepping module 228. As shown in the graph 300, different frequency bands can be selected as time advances. In one embodiment, the frequency stepping module 228 repeatedly steps through the frequencies. A linear stepping of frequencies is shown, from lowest to highest bands. However, as mentioned above, the frequency bands can be varied, for example, randomly, by the frequency stepping module 228.

Referring again to FIG. 2, the frequency stepping module 228 can provide waveforms at the selected frequencies to an antenna interface 230. The antenna interface 230 can include, for example, a power amplifier or other associated circuitry. The antenna interface 230 can provide an amplified frequency waveform as a transmit signal to one or more antennas 214. The one or more antennas 214 can include a single antenna, an array of antennas (such as a phased array), or some other configuration of antennas. In addition, the antenna interface 230 can provide the transmit signal to the receiver (transmit signal 240). The transmit signal 240 can advantageously be used by the receiver to reduce phase noise in the receiver, as will be described in greater detail below.

Receiver—Digital Down-Conversion

Figure 4A:
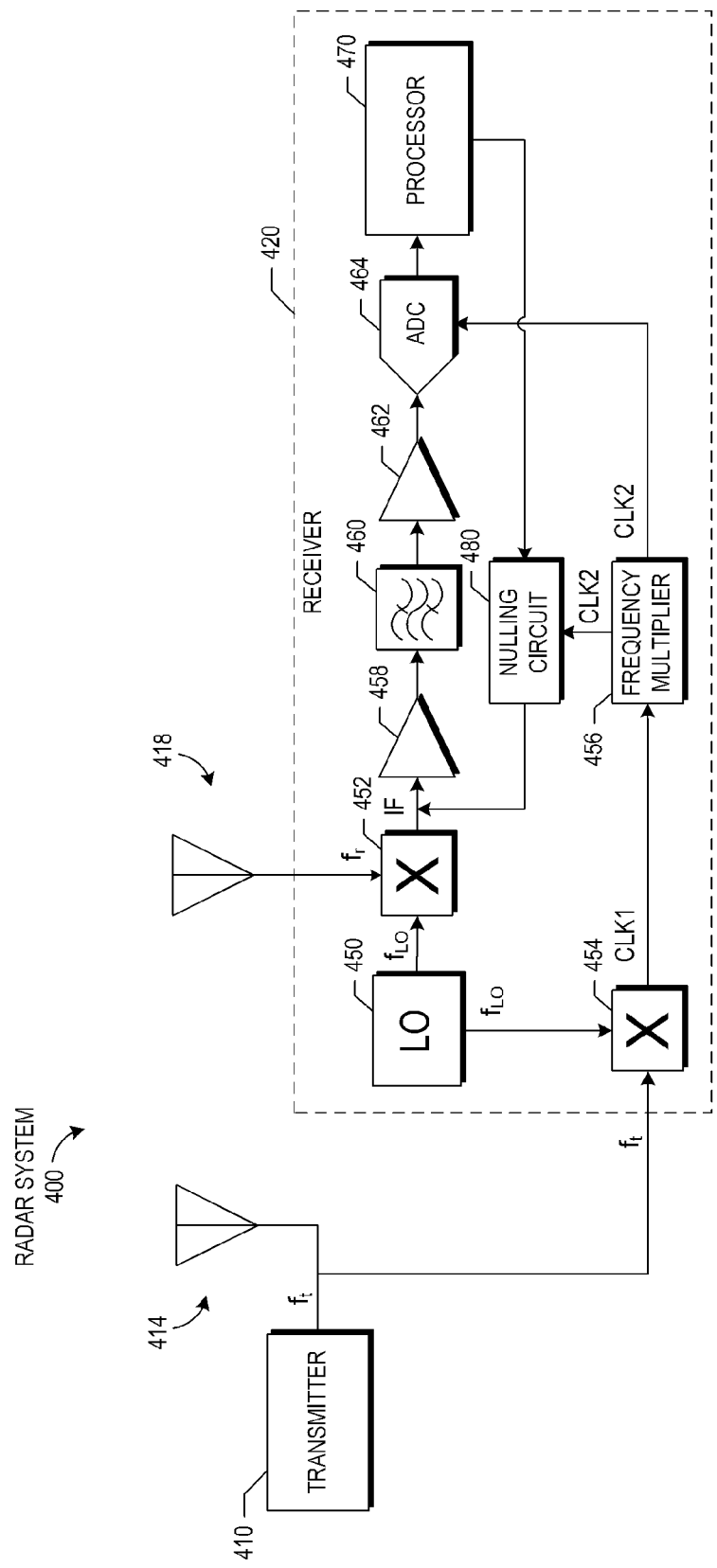
FIGS. 4A and 4B illustrate embodiments of a receiver of the radar system of FIG. 1.
Figure 4B:
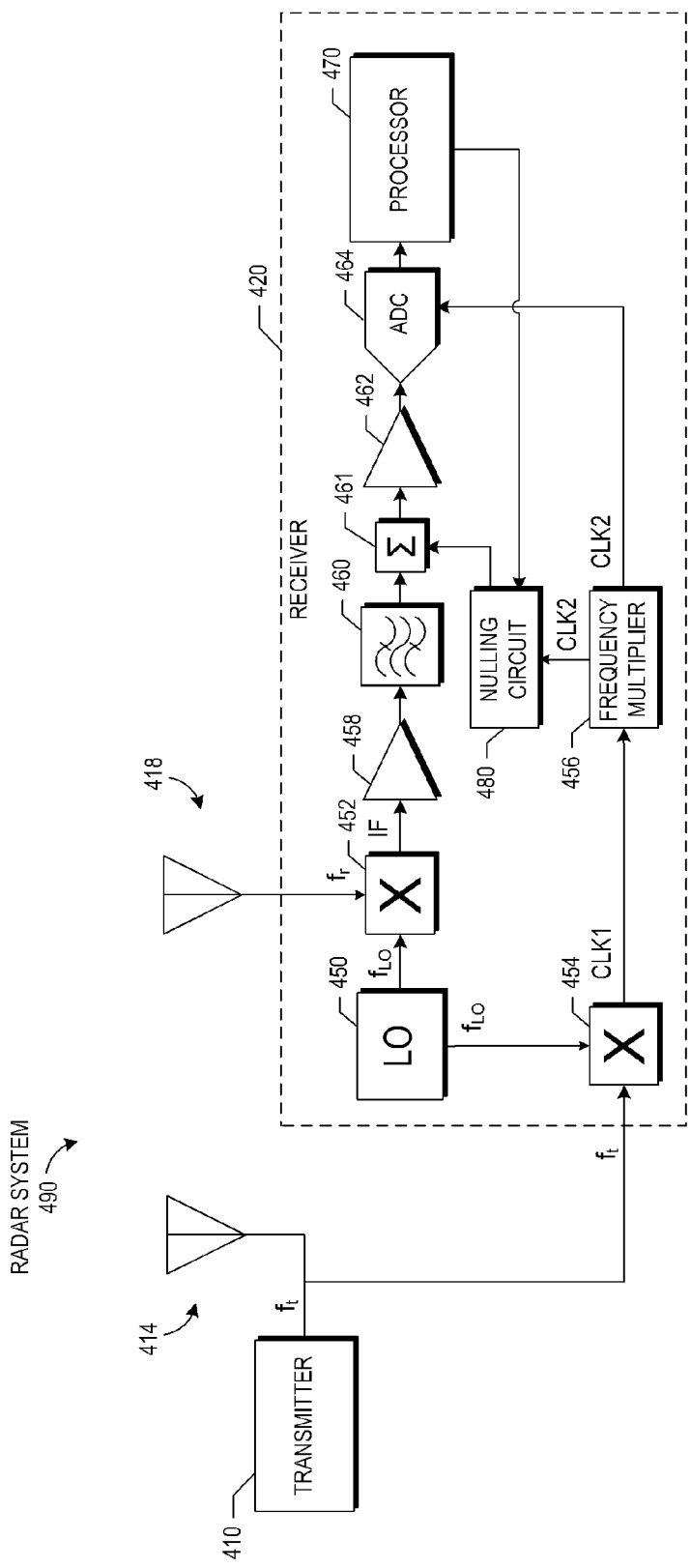

FIGS. 4A and 4B illustrate embodiments of a radar receiver 420 in the context of a radar system 400. The radar system 400 is a more detailed embodiment of the radar system 100 described above. In addition to including the receiver 420, the radar system 100 includes a transmitter 410 and associated antenna(s) 414. The transmitter 410 can include all the features of the transmitters 110, 210 described above. Likewise, the receiver 420 can include all the features of the receiver 120 described above.

Advantageously, in certain embodiments, the receiver 420 can reduce phase noise, perform digital down-conversion, and perform improved nulling. Phase noise reduction and digital down-conversion are described herein with respect to FIGS. 4A and 4B. Improved nulling is described in greater detail below with respect to FIGS. 5A through 7. Different implementations of a radar receiver can provide a subset of the features described herein.

In operation, the transmitter 410 sends a transmit signal $f_t$ to one or more antennas 414, which transmit the signal at a target (not shown). In response, the receiver 420 obtains a receive signal, $f_r$, with one or more antennas 418. The receive signal $f_r$ is at RF and includes the transmit signal $f_t$ as a direct path component and a signal of interest component, such as a time-shifted transmit signal from one or more reflecting objects. The receive signal $f_r$ is provided to a mixer 452 in the receiver, which mixes the receive signal ($f_{LO}$) with a local oscillator 450 to produce an IF signal. A common choice of IF carrier frequency is 10.7 MHz, although other IF carrier frequencies can be used. For purposes of illustration, the remainder of this specification will describe receive examples in the context of a 10.7 MHz IF frequency.

The local oscillator 450 can track the transmit frequency $f_t$. Thus, for example, to obtain the IF signal, the signal $f_{LO}$ output by the local oscillator 450 can be equal to $f_t$+10.7 MHz. As the transmitter 410 changes the transmit frequency $f_t$, the local oscillator 450 can synchronously change its output frequency to match the transmit frequency $f_t$. For example, the frequency stepping module 228 in the transmitter 210 of FIG. 2 and the local oscillator 450 in the receiver 420 can be synchronized.

To improve phase coherence between the transmitter 410 and receiver 420, in certain embodiments, the local oscillator signal $f_{LO}$ is mixed with the transmit frequency $f_t$ by a mixer 454. The output of this mixer 454 is a control signal, which in some implementations is a clock signal (CLK1). In one embodiment, the frequency of the clock signal CLK1 is the same or substantially the same as the center frequency of the IF signal. Thus, if the frequency of the IF signal is 10.7 MHz, the frequency of the clock signal CLK1 can be 10.7 MHz. However, because the clock signal CLK1 is generated in part from the transmit frequency $f_t$, the clock signal CLK1 can be phase coherent or substantially phase coherent with the transmit frequency $f_t$. The clock signal CLK1 can also be phase coherent or at least partially phase coherent with the IF signal because both the IF signal and the clock signal CLK1 may be generated using the same local oscillator 450. These phase coherencies can provide several benefits, as will be discussed herein.

One benefit provided by this mixing, in some embodiments, is the reduction or attenuation of phase noise when digitizing the IF signal. In addition, this mixing can facilitate digital down-conversion from IF to baseband. In the depicted embodiment, digitization of the IF signal is accomplished by increasing the frequency of the clock signal CLK1 with a frequency multiplier 456. In certain embodiments, the frequency multiplier 456 is a circuit that multiplies the frequency of the clock signal CLK1 by a value to produce a second clock signal (CLK2). For example, the frequency multiplier 456 can multiply the clock signal CLK1 by four. If the CLK1 signal has a frequency of 10.7 MHz, for instance, the CLK2 signal can multiply this signal by four to produce a signal with a frequency of 42.8 MHz. Multiplying the clock signal CLK1 signal by four can provide benefits in the digital domain, as will be seen shortly.

In certain embodiments, for the phase noise cancellation to be effective, the time, or phase, delays of the IF signal processing components 458, 460 and 462 are closely or substantially matched or the same as the phase delays of the CLK1 and CLK2 generation components 454, 456. In one embodiment, a delay-equalizing element (not shown) is added between the clock generation components 454 and 456 to attain substantially equal delays in IF and CLK2 signal paths.

The clock signal CLK2 is provided to an analog-to-digital (A/D or ADC) converter 464. The ADC 464 receives the IF signal after filtering and amplification by stages 458, 460, 462. The filtering and amplification stages 458, 460, 462 are shown by way of example, and these stages can be varied in certain embodiments to include more or fewer components. The filtered and amplified IF signal is sampled by the ADC 464 at a sampling rate that is, in one embodiment, the rate of the clock signal CLK2. Thus, if the IF signal is at 10.7 MHz, and the clock signal CLK2 is four times the IF signal (e.g., 42.8 MHz), the ADC 464 oversamples the IF signal by a factor of two (two times the Nyquist rate of 21.4 MHz). It should be noted that while the previous example illustrates low-pass sampling of the IF signal, the ADC 464 can also perform band-pass sampling of the IF signal in certain embodiments. The ADC 464 provides the digitized samples to a processor 470. As described in detail below (see "Terminology" section), the processor 470 can be any form of processor, including a Field Programmable Gate Array (FPGA).

Advantageously, in certain embodiments, because the clock signal CLK2 is generated from the same local oscillator 450 as the IF signal, the clock signal CLK2 can be phase coherent or substantially phase coherent with the IF signal. Thus, when the IF signal fluctuates due to the $f_{LO}$ and/or $f_t$ signals fluctuating, the clock signals CLK1 and CLK2 fluctuate in the same or substantially the same manner as the IF signal (because the CLK1 signal is generated from the $f_{LO}$ or $f_t$ signals). Phase noise or jitter in digitizing the IF signal can therefore be attenuated.

It should be noted that the mixer 454 and the frequency multiplier 456 can be considered example implementations of the phase correction circuitry 124 described above with respect to FIG. 1. The phase correction circuitry 124 can also include the ADC 464 in one embodiment. In addition, in some embodiments, the mixer 454 is considered to be the phase correction circuitry 124.

Digitizing the IF signal at four times the frequency of the IF signal can result in samples that are 90 degrees out of phase with one another. The sequence of values for a cosine wave can be 1, 0, −1, 0, for instance. This can be seen, for example, in a graph 590 of FIG. 5B, where "x" symbols 594 indicate over-sampled sine values. Referring again to FIGS. 4A and 4B, to shift the phase of the waveform 90 degrees, the processor 470 can start the sequence of values at the second sample: 0, −1, 0, 1. This frequency shifting can allow the processor 470 to obtain quadrature components of the IF signal. The processor 470 can then digitally mix the in-phase IF waveform (1, 0, −1, 0) and the quadrature IF waveform (0, −1, 0, 1) each with a sine carrier wave and apply appropriate filtering to digitally down-convert the IF signal to baseband.

A computationally-efficient way to perform this downconversion in certain embodiments is for the processor 470 to generate the first quadrature component by subtracting the third sample of a set of four from the first sample. The second quadrature component is obtained by subtracting the fourth sample from the second sample. This can be equivalent to multiplying the input sample set by a sine wave (0,1,0,−1) and by a cos wave (1,0,−1,0) generated from the four times clock signal CLK2. The processor 470 can then perform target detection and image processing on the combined baseband signal.

Viewed another way, the samples (1, 0, −1, 0) can be the taps or filter coefficients of a finite impulse response (FIR) filter that is applied to the IF signal to produce the baseband signal. It should also be noted that while the IF samples have been illustrated herein as normalized to 1, the samples may take any value (e.g., a,b,c,d) to provide amplitude scaling and/or phase shifting.

Figure 7:
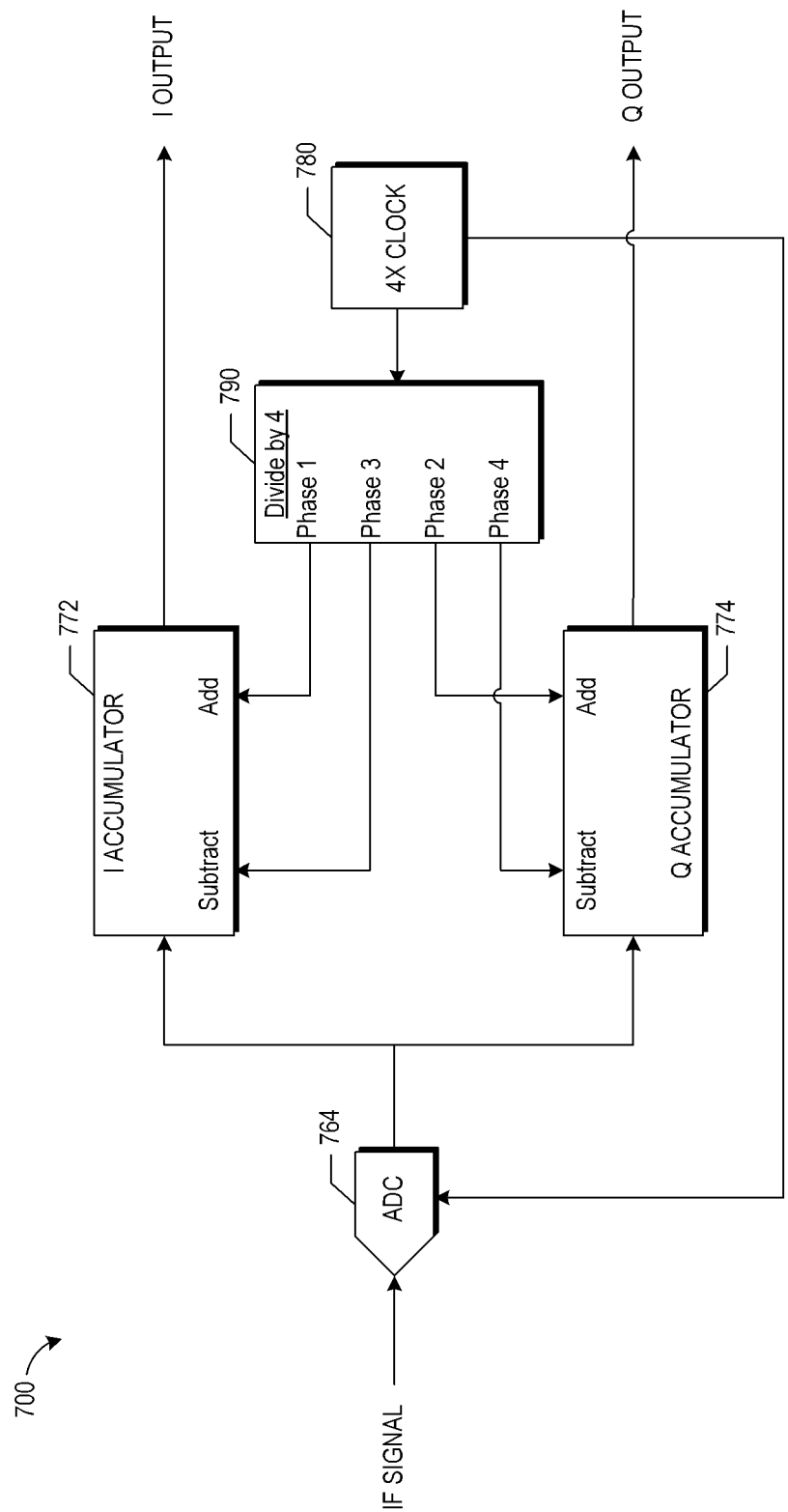
FIG. 7 illustrates an embodiment of a digital downconversion circuit.

An embodiment of this computationally-efficient digital downconversion method is illustrated in FIG. 7. Referring to FIG. 7, an IF signal is provided to an ADC 764. The ADC 764 can be the same ADC 464 illustrated with respect to FIG. 4A.

The ADC 764 digitizes the IF signal and provides the digitized IF signal to two quadrature accumulators 772, 774. Each quadrature accumulator 772, 774 can generate a quadrature output signal (I and Q outputs). The quadrature accumulators 772, 774 can be implemented in software or firmware of the process 470 or in other hardware.

In an embodiment, each quadrature accumulator 772, 774 essentially implements a band-pass FIR filter that downconverts the IF signal to a baseband quadrature signal (I or Q). The filter coefficients of the quadrature accumulators 772, 774 are 90 degrees out of phase with one another, thereby providing in-phase and quadrature signal outputs. These coefficients are generated by the four times clock signal 780, which controls a divide-by-four sampler 790. The four times clock signal 780 can be obtained from the frequency multiplier 456 described above. The divide-by-four sampler 790 can provide four samples for each period of the four times clock signal 780, referred to as phases 1 through 4 in FIG. 7. For example, normalized samples (1, 0, −1, 0) can be output at a first clock period, (0, −1, 0, 1) at a second clock period, and so forth. The samples need not be normalized to 1 in some implementations.

The first and third phases or samples of the divide-by-four sampler 790 are supplied to the quadrature accumulator 772, and the second and fourth samples of the divide-by-four sampler 790 are provided to the quadrature accumulator 774. The samples provided by the divide-by-four sampler 790 can be the coefficients of the accumulators 772. Thus, within each quadrature accumulator 772, a data word of the digitized IF signal could be multiplied by the received samples and then summed to perform band-pass FIR filtering. However, because the samples are alternating 1s and −1s, interspersed by 0s, the multiplication can be avoided. Instead, band-pass filtering can be performed by subtracting the first and third samples in the accumulator 772 and subtracting the second and fourth samples in the accumulator 774. The output of each subtraction is provided as a sample for each I and Q output, respectively. Thus, no multiplications are needed to perform the downconversion in certain embodiments.

Baseband processing by the processor 470 can combine the I and Q signals, for example, by calculating the baseband magnitude sqrt($I^2+Q^2$) and phase arctan(I/Q). Alternatively, the processor 470 can analyze the I and Q components separately. Further, it should be noted that the digital downconversion techniques described herein can be used in other communications contexts outside of the radar context, such as in radio receivers. For instance, these digital downconversion techniques can be used in FM radio demodulation to obtain I and Q components, which may be analyzed together or separately.

Advantageously, in certain embodiments, this digital down-conversion further allows in-phase and quadrature baseband conversion to be performed with a single ADC, the ADC 464. Normally, in-phase and quadrature signals are sampled with two ADCs that sample 90 degrees out-of-phase. Maintaining phase coherence and the precise 90 degree phase shift between the ADCs can be difficult. Digitally downconverting or demodulating the IF signal in the processor 470 can avoid this problem of maintaining phase coherence and can reduce hardware cost and complexity.

Another advantage to digitally down-converting the signal is that digital filters can be used in baseband processing. Digital filters can be more accurate than analog filters. In addition, digital filters can advantageously be controlled to avoid filtering transient signals. Transient signals can be received by the radar receiver 420 when frequencies shift or when pulses are received. These transients can cause filters to ring or oscillate, eventually settling to more stable output. To avoid this ringing, in certain embodiments, the processor 470 can reset a baseband processing filter or filters for a short time when transmit frequencies are switched or when pulses initially occur or end. For example, if frequencies are stepped through at certain predefined times, the processor 470 can be programmed to reset the filter(s) a short period after each predefined time that the frequency step changes. Alternatively, the processor 470 does not reset the filters but instead discards the output of the filters for a short period after transients occur, or instead smooths the output of the filters after transients occur.

Receiver—Wideband Nulling

The receiver 420 also includes a nulling circuit 480. The nulling circuit 480 can include all the features of the nulling circuit 122 discussed above. For example, the nulling circuit 480 can generate a nulling signal and combine this nulling signal with the IF signal to attenuate a direct path component of the IF signal. In the depicted embodiment, the nulling circuit 480 is controlled by the CLK2 signal received from the frequency multiplier 456.

This control arrangement can advantageously result in the nulling circuit 480 being in phase with the direct path component of the IF signal. This phase coherency arises in certain embodiments because the direct path component (down-converted $f_t$) can have the same or substantially similar phase as the transmit signal ($f_t$) due to the operation of the mixer 454. A small time delay can exist between the down-converted $f_t$ and the transmit signal $f_t$ due to the travel of the direct path wave from the antenna 414 to the antenna 418. Since, in certain embodiments, the nulling signal incorporates some or all delays in some or all signals to be nulled, this small time delay has little or no effect on the nulling.

The nulling circuit 480 is further controlled by the processor 470. Digital control by the processor 470 can improve the precision of the nulling circuit 480 over analog implementations. Example features of the nulling circuit 480, including digital control, will be described in more detail with respect to FIGS. 5A through 7.

Figure 5A:
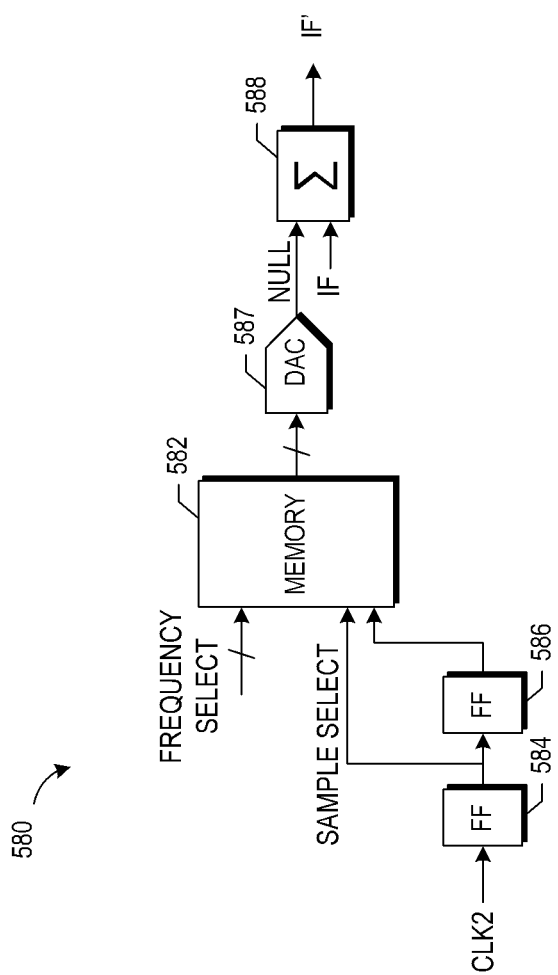
FIG. 5A illustrates an embodiment of a nulling circuit of the receiver of FIGS. 4A and 4B.
Figure 5B:
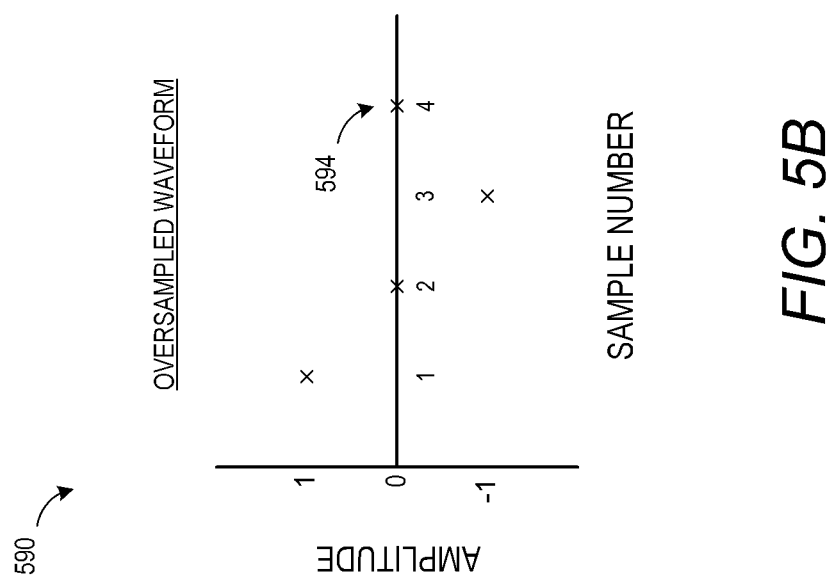
FIG. 5B illustrates an example of waveforms that can be employed by the nulling circuit.

Referring to FIG. 5A, a more detailed embodiment of a nulling circuit 580 is depicted. The nulling circuit 580 can include all the features of the nulling circuits 122, 480 discussed above. For example, the nulling circuit 580 can be implemented in the receiver 120 or 420. In the depicted embodiment, the nulling circuit 580 includes a memory device 582, a digital-to-analog converter (DAC) 587, and a summing circuit 588. The nulling circuit 580 also includes flip-flops or latches 584, 586 in communication with the memory 582.

By way of overview, a frequency select signal (explained below) and the clock signal CLK2 control the memory 582, causing the memory 582 to output a digital nulling signal. This digital nulling signal is provided to the DAC 587, where it is converted to an analog nulling signal. In some embodiments, the nulling signal is generated so as to be 180 degrees or approximately 180 degrees out of phase with the direct path signal component of the IF signal. Thus, when the nulling signal is combined with the IF signal at the summer 588, the nulling signal attenuates or nulls the direct path component of the IF signal to produce a new IF signal, IF'. In other embodiments, the nulling signal is in-phase with the direct path component, and the summer 588 takes the difference of the IF signal and the nulling signal. For example, the summer 588 can be a difference amplifier.

The memory 582 can store nulling signal values for each frequency step of the wideband radar system 100 or 400. For example, if the wideband radar system 100 or 400 operates on one hundred stepped frequency bands, the memory 582 can store one hundred different nulling signals. Collectively, these nulling signals or any other set of nulling signals for different frequencies can also be referred to generally as the "nulling signal." The frequency select signal can be generated by the processor 470 to select which nulling signal is output by the memory 582. The frequency select signal can include an address of the frequencies stored in the memory 582. For example, if the transmitter is currently transmitting on 0.5 GHz, the processor 470 can generate a frequency select signal that causes the memory 582 to select the nulling signal at 0.5 GHz. Thus, the nulling circuit 580 can advantageously generate nulling signals synchronously with the frequency stepping or sweeping of the transmitter in certain embodiments. It should be noted, however, that the number of nulling signals stored in the memory 582 can be fewer than the number of frequency steps in some embodiments.

The nulling signals stored in memory can each have four samples if frequency quadrupling is used to sample the IF, as described above with respect to FIGS. 4 and 5B. Thus, the CLK2 signal can cause each of these four samples in succession to be output from the memory 582. The CLK2 signal communicates with the two flip-flops 584, 586 to alternate between the four samples, which can be addressed by logical values 00, 01, 10, 11. The generation of the contents of the memory 582 is described below with respect to FIG. 6. Advantageously, in certain embodiments, the use of the four times clock (CLK2) allows the generation of any arbitrary phase of the nulling signal without the use of analog phase shift circuitry.

Certain implementations of the receiver 420 include frequency selective components and their inherent delays. In one embodiment, the time delay of CLK2 and the IF of FIG. 5A are matched or substantially matched at the input of 588 by careful selection of the delays of the IF and CLK2 signal processing elements and the addition of additional delay elements (not shown). To avoid the bulk of the time misalignment, in certain embodiments, the summation of the IF and nulling signals could occur between the components 460 and 462. For example, as FIG. 4B illustrates such an example scenario. FIG. 4B depicts a radar system 490 that includes all the features of the radar system 400 of FIG. 4A, except that a summation component 461 is placed between the components 460 and 462. The nulling circuit 480 supplies a nulling signal to the summation component 461 to thereby provide nulling in the amplified and filtered IF signal.

Although an analog nulling signal is described in this embodiment, in some embodiments, the digital nulling signal generated by the memory 582 can be combined with the digitized IF signal (see FIGS. 4A and 4B) to null digitally in the processor 470.

Figure 6:
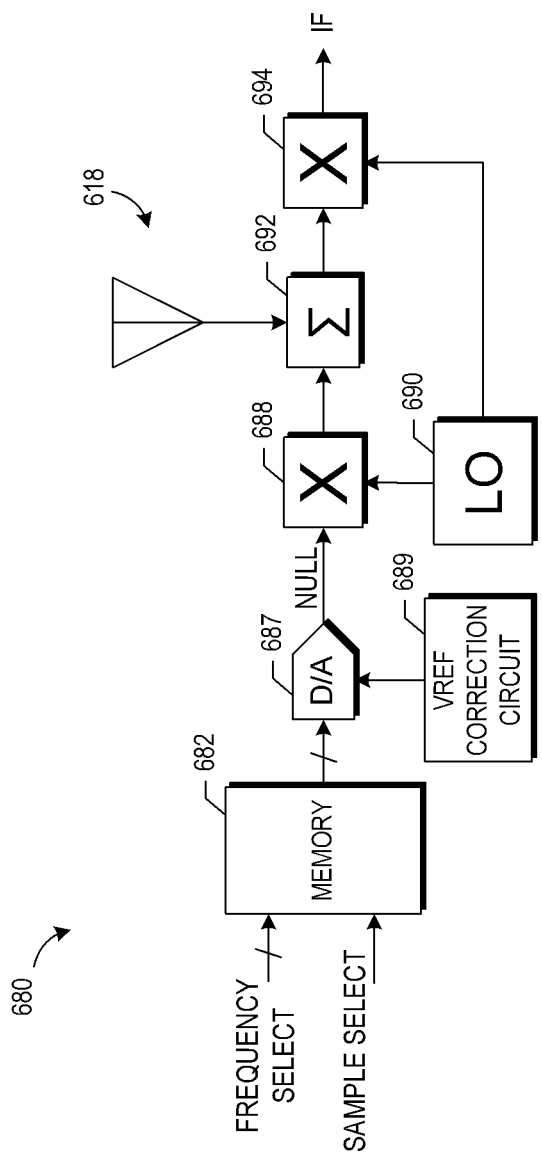
FIG. 6 illustrates another embodiment of a nulling circuit.

FIG. 6 illustrates another embodiment of a nulling circuit 680 that can be implemented by the receiver 120 or 420. The nulling circuit 680 can include certain of the features of the nulling circuits 122, 480, and 580 described above. For instance, the nulling circuit 680 includes a memory 682 controlled by a frequency select signal (e.g., from the processor 470) and a sample select signal. In this circuit 680, however, nulling is done at RF instead of IF. Nulling at RF may be desired in some implementations when a low-noise amplifier (not shown) is used to amplify the RF signals. Nulling at RF can also be useful when more range is desired, such as in airborne radar applications.

The memory 682 can operate as described above with respect to FIG. 5A. For example, the memory 682 can output a digital nulling signal synchronously with the CLK2 (not shown). A DAC 687 converts the nulling signal to an analog nulling signal. The nulling signal is provided to a mixer 688, which also receives a local oscillator signal from a local oscillator 690. In one embodiment, the mixer 688 is a single-sideband (SSB) mixer, which outputs the lower (or upper) sideband of the mixed local oscillator and nulling signal. The lower sideband, in this case, is the nulling signal, phase adjusted to be coherent with the local oscillator 690.

The local oscillator 690 also provides the local oscillator signal to an IF mixer 694, which outputs an IF signal. Thus, the nulling signal output by the mixer 688 and the IF signal output by the mixer 694 can be in phase or substantially in phase. The nulling signal output by the mixer 688 is combined with the RF signal received by an antenna 618 by combiner 692. The combiner 692 can be a summer or difference amplifier, as described above with respect to FIG. 5. The combiner 692 therefore causes the nulling signal to attenuate the direct path component of the RF signal received by the combiner 692. The combiner 692 outputs a nulled RF signal to the mixer 694 for down-conversion to IF.

Additional correction to the nulling signal can be made by adjusting a voltage reference used by the DAC 687 and/or other circuitry of the radar system in order to account for time-varying processes. For instance, a voltage reference (VREF) correction circuit 689 can be provided. This correction circuit 689 can include a temperature sensor such as a thermistor that detects temperature variations in voltage reference circuitry (not shown) that generates a voltage reference for the DAC 687. Temperature variations can cause drift in electronic components that might affect the voltage reference and therefore accuracy of the DAC 687. The correction circuit 689 can also include an operational amplifier or other amplifier that can amplify the detected temperature variation and provide feedback to the voltage reference generating circuitry to thereby stabilize the voltage reference.

In addition, amplitude noise due to varying transmitter power levels can be compensated for in the DAC 687 and/or other circuitry of the radar system. If the transmitter power were to drop to half its normal level, due to a low battery for instance, the nulling signal might still be the same level, resulting in the nulling signal having twice the power of the transmitter signal. This undesirable condition can be averted in one embodiment by including a power measurement circuit in the correction circuit 689. The power measurement circuit can measure the power of the transmitter signal or of a clock signal generated from the transmitter signal. An operational amplifier or other amplifier in the correction circuit 689 can generate a feedback signal responsive to the power level, which can correspondingly reduce (or increase) the voltage reference level. With a different voltage reference level, the DAC 687 can generate a nulling signal that corresponds to the transmit power signal level.

Figure 8:
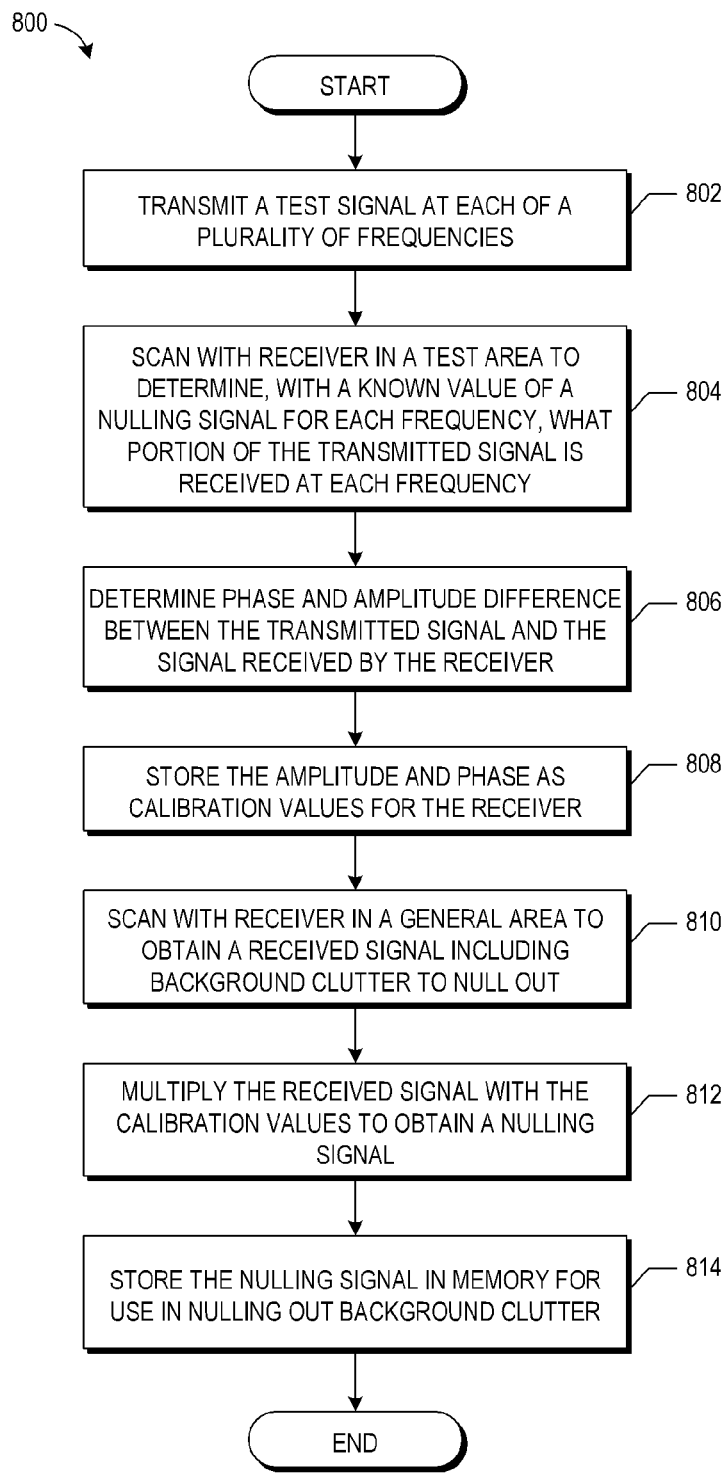
FIG. 8 illustrates an embodiment of a process for generating a nulling signal.

One approach to generating the nulling file stored in the memory 682 (or 582) is to first perform a calibration of the radar system, and then to generate the nulling file. For example, FIG. 8 illustrates a process 800 for generating a nulling file, for example, using the processor 470. At block 802, a test signal is transmitted at a plurality of frequencies. Calibration can be performed in a controlled environment (e.g., with a controlled amount of clutter) by scanning with the receiver at block 804 to determine, with a known value of a nulling signal for each frequency, what is received at each frequency. This scanning can be done with or without the receive antenna connected. At block 806, the processor 470 can determine the phase and amplitude difference between the transmitted signal and the signal received by the receiver. This amplitude and phase ($k_{cal}$, $\theta_{cal}$) can be stored as calibration values by the processor 470 at block 808. In some implementations, this calibration process is performed once for a radar system but there is no restriction on when or how often the calibration is performed.

Thereafter, the nulling file can be generated to null out the direct path signal and optionally any undesired clutter. For instance, at block 810, the receiver can scan in a general area (e.g., out of doors, in an open field, or even near a building) to determine what is received. This received signal can be multiplied by the calibration values at block 812 to generate the nulling signal. The nulling signal can then be stored by the processor 470 in the memory 582 or 682 at block 814. Thus, for instance, if the nulling signal is generated near a building, reflections from the building can be nulled out when detecting targets with the radar system. As a result, the building can appear not to be detected by the radar system, whereas a moving target near the building would likely be detected.

One application for nulling in this manner is persistent surveillance. The surroundings of a surveillance area can be nulled out by the nulling file generation process described above. Thereafter, if a target (e.g., an individual) approaches the surveillance area, the radar system can detect the presence of the individual without outputting the clutter from the surroundings. In fact, in one embodiment, any change in the surroundings (as in a movement by an individual into the area, for example) can be detected by the radar system as an intrusion, without using complicated imaging algorithms.

The process 800 illustrated with respect to FIG. 8 can also be used to remove moving aspects of a scene. For instance, if the radar system is installed on a moving vehicle, the process 800 can be used to generate a nulling file that removes the moving components of the scene due to motion of the vehicle. Other stationary or moving components (moving at a different velocity from the vehicle) can be therefore more efficiently detected by the radar system. It should also be noted that blocks 802 through 808 of the process 800 can be implemented during manufacturing, resulting in set amplitude and phase calibration values. Thereafter, blocks 810 through 812 can be used to generate a nulling file for any scene, whether the radar system is stationary or moving.

Many other variations and applications of the wideband radar systems disclosed herein will be apparent from and are considered to be within the scope of this disclosure. For example, some or all of the features described herein can be used outside of the radar context. For instance, the radar systems described above can be used as vector network analyzers (e.g., without antennas). Further, not all of the features described above need be implemented in a radar system. For instance, a radar or other RF system could implement the phase noise correction features but not the digital downconversion features, and vice versa. Likewise, some or all of the other features described herein can be used together or implemented individually in a radar or other RF system.

Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. For example, the vehicle management system 110 or 210 can be implemented by one or more computer systems or by a computer system including one or more processors. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for reducing noise in a radar, the system comprising:
   a radar transmitter configured to transmit a transmit wideband signal; and
   a radar receiver configured to receive a receive wideband signal, the receive wideband signal comprising a portion of the transmit wideband signal, the radar receiver comprising:
      an intermediate frequency stage configured to downconvert the receive wideband signal into an intermediate frequency signal,
      a mixer configured to generate a control signal at least partially from the transmit wideband signal and from an oscillator of the intermediate frequency stage, and
      a nulling circuit in communication with the intermediate frequency stage, the nulling circuit configured to generate a nulling signal based at least in part on the control signal, the control signal configured to cause the nulling signal to be substantially in phase with the intermediate frequency signal.

2. The system of claim 1, wherein the nulling circuit is further configured to combine the nulling signal with the intermediate frequency signal so as to attenuate the portion of the transmit wideband signal in the intermediate frequency signal.

3. The system of claim 1, wherein the nulling circuit is further configured to generate the nulling signal combine the nulling signal with the receive wideband signal so as to attenuate the portion of the transmit wideband signal in the received wideband signal.

4. The system of claim 1, further comprising a processor configured to digitally downconvert the intermediate frequency signal to at least one baseband signal subsequent to application of the nulling signal to the intermediate frequency signal.

5. The system of claim 4, wherein said digital downconversion enables the intermediate frequency signal to be sampled with a single analog-to-digital converter.

6. The system of claim 4, wherein the processor is further configured to digitally downconvert the intermediate frequency signal into first and second quadrature signals by at least calculating differences between alternating pairs of samples of the intermediate frequency signal.

7. The system of claim 4, wherein the processor is a field programmable gate array programmed to perform said digital downconversion.

8. The system of claim 1, further comprising a correction circuit configured to adjust the nulling signal responsive to a change in power level of the transmit wideband signal.

9. A method of reducing noise in a radar, the method comprising:
 transmitting a transmit signal with a radar transmitter;
 receiving a receive signal with a radar receiver, the receive signal comprising at least a portion of the transmit signal;
 mixing the receive signal at the radar receiver with an oscillator of the radar receiver to produce a first clock signal;
 generating an intermediate frequency signal from the receive signal with the oscillator of the radar receiver; and
 sampling the intermediate frequency signal at a rate that depends at least in part on the first clock signal, such that phase noise in the intermediate frequency signal is reduced.

10. The method of claim 9, further comprising increasing a frequency of the first clock signal to produce a second clock signal.

11. The method of claim 10, wherein said sampling the intermediate frequency signal comprises sampling the intermediate frequency signal at a rate determined by the second clock signal.

12. The method of claim 11, wherein said increasing the frequency of the first clock signal comprises quadrupling the frequency of the first clock signal.

13. The method of claim 9, wherein said sampling the intermediate frequency signal comprises sampling the intermediate frequency signal with a single analog-to-digital converter (ADC) port.

14. The method of claim 13, further comprising deriving first and second quadrature signals from the sampled intermediate frequency signal.

15. The method of claim 14, wherein said deriving the first quadrature signal comprises calculating differences between first alternating pairs of samples of the intermediate frequency signal.

16. The method of claim 15, wherein said deriving the second quadrature signal comprises calculating difference between second alternating pairs of the intermediate frequency signal.

17. The method of claim 9, further comprising generating a nulling signal configured to attenuate at least a portion of the transmitted signal received with the radar receiver.

18. The method of claim 9, further comprising generating a nulling signal configured to attenuate at least a portion of a scene being scanned by the radar receiver.

19. The method of claim 18, wherein the nulling signal is further configured to attenuate one or more stationary objects in the scene, thereby facilitating detection of moving objects in the scene.

20. The method of claim 18, wherein the nulling signal is further configured to attenuate one or more objects in the scene that are in motion due to motion of the radar receiver.

21. The method of claim 14, further comprising applying baseband processing to one or both of the first and second quadrature signals.

22. The method of claim 21, wherein said applying baseband processing comprises applying a digital filter to one or both of the first and second quadrature signals.

23. The method of claim 22, further comprising resetting the digital filter in response to a change in a frequency of the transmitted signal to avoid filtering transients associated with the frequency change.

\* \* \* \* \*